United States Patent [19]

Hoxmeier

[11] Patent Number: 4,892,928
[45] Date of Patent: Jan. 9, 1990

[54] HYDROGENATION PROCESS

[75] Inventor: Ronald J. Hoxmeier, Houston, Tex.

[73] Assignee: Shell Oil Company, Houston, Tex.

[21] Appl. No.: 256,537

[22] Filed: Oct. 12, 1988

[51] Int. Cl.$^4$ ................................................ C08F 8/04
[52] U.S. Cl. .................... 525/338; 525/329.3; 525/339
[58] Field of Search ................................ 525/338, 339

[56] References Cited

U.S. PATENT DOCUMENTS

| | | | |
|---|---|---|---|
| 3,135,716 | 6/1964 | Uraneck et al. | 260/45.5 |
| 3,700,637 | 10/1972 | Finch | 260/83.3 |
| 3,950,304 | 4/1976 | Inomata et al. | 525/338 |
| 3,951,933 | 4/1976 | Nasser, Jr. | 525/338 |
| 4,337,329 | 6/1982 | Kubo et al. | 525/339 |
| 4,452,951 | 6/1984 | Kubo et al. | 525/339 |
| 4,510,293 | 4/1985 | Kubo et al. | 525/339 |
| 4,629,767 | 12/1986 | Shyr et al. | 525/338 |
| 4,647,627 | 3/1987 | Buding et al. | 525/234 |

FOREIGN PATENT DOCUMENTS 1558491 1/1980 United Kingdom .
2087403A 5/1982 United Kingdom .

Primary Examiner—Joseph L. Schofer
Assistant Examiner—Bernard Lipman

[57] ABSTRACT

A process for selectively hydrogenating a polymer containing ethylenic unsaturation and cyano groups with a catalyst prepared by combining one or more of certain palladium compounds and one or more of certain aluminum compounds in a suitable solvent or diluent. The hydrogenation is accomplished in a suitable solvent for the polymer at a temperature within the range from about 20° C. to about 175° C. at a total pressure within the range from about 50 to about 1,000 psig and at a hydrogen partial pressure within the range from about 50 to about 950 psig. The hydrogenation can be accomplished so as to convert at least about 85% of the ethylenic unsaturation contained initially in the polymer without converting a significant portion of the cyano groups to amine groups. Best results are achieved when the catalyst is prepared by combining the one or more palladium compounds and the one or more aluminum compounds in proportions such that the Al:Pd atomic ratio is within the range from about 0.3:1 to about 0.9:1. Catalysts prepared in an ether solvent or diluent are more active than catalysts prepared in hydrocarbon solvents or diluents.

14 Claims, 1 Drawing Sheet

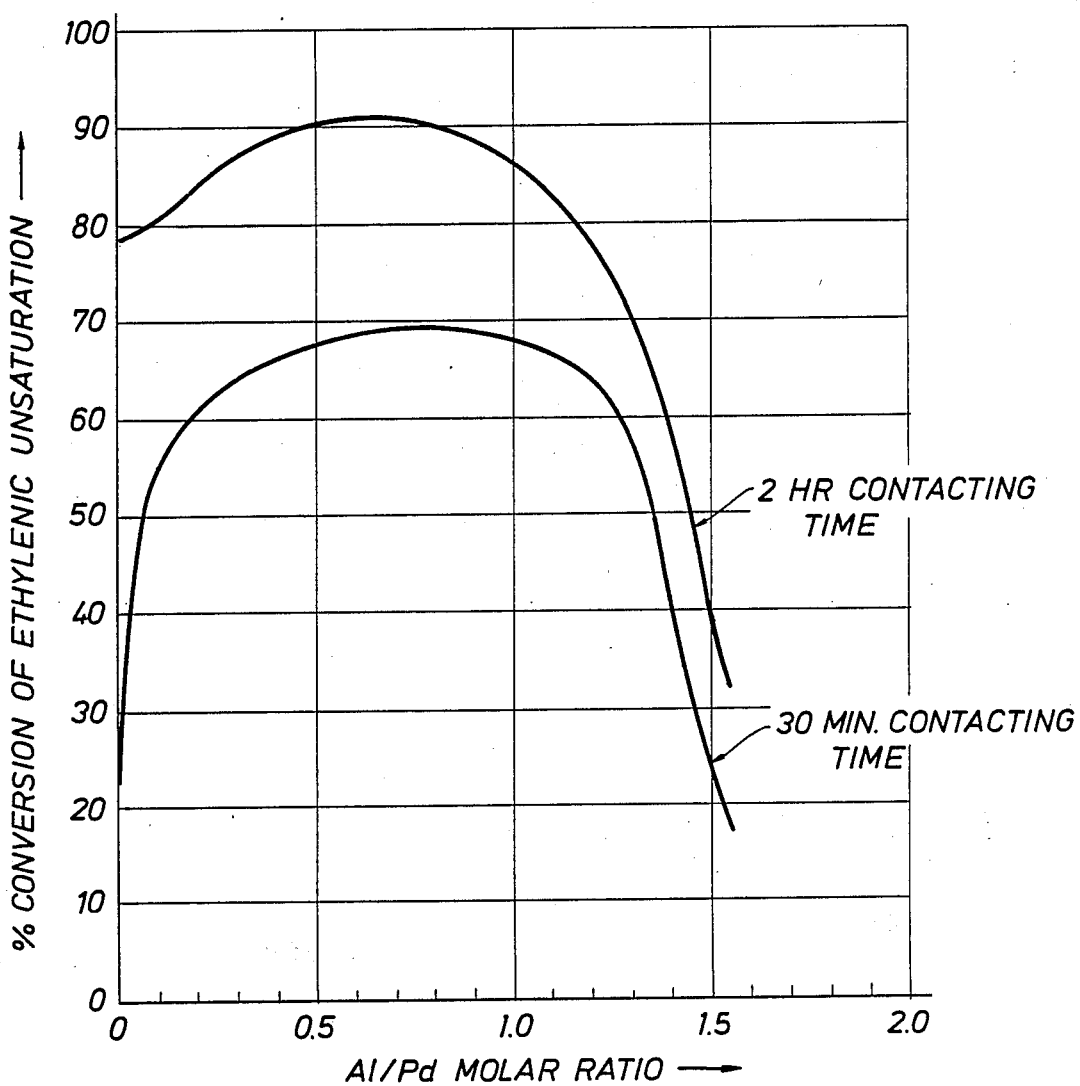

HYDROGENATION PROCESS

BACKGROUND

1. Field of the Invention

This invention relates to a method for hydrogenating polymers containing ethylenic unsaturation. More particularly, this invention relates to a process for selectively hydrogenating ethylenic unsaturation contained in a polymer comprising ethylenic unsaturation and one or more cyano groups.

2. Prior Art

Polymers containing both ethylenic unsaturation and cyano groups are, of course, well known in the prior art. Most frequently, such polymers are prepared by copolymerizing a polyolefin, particularly a diolefin, and an ethylenically unsaturated nitrile such as acrylonitrile. Such polymers may also incorporate other monomer units such as monomers which would incorporate aromatic unsaturation into the polymer. Polymers prepared by copolymerizing a conjugated diolefin, particularly butadiene, with an ethylenically unsaturated nitrile, particularly acrylonitrile are, of course, well known in the prior art and such polymers have been produced commercially for some time. Perhaps the most common use for such polymers is as a synthetic rubber but such polymers are produced in a rather broad range of relative compositions over a broad range of molecular weights and have a wide range of end use applications. For example, such polymers are known to be useful in fibers, packings, seals, tubes, membranes, sheaths and the like. As is well known in the prior art, however, the polymer generally cannot be used neat in many of these end use applications due to poor oxygen and ozone resistance and to poor thermal stability.

It is, of course, known in the prior art to improve oxygen and ozone resistance as well as thermal stability by selectively hydrogenating the polymer thereby reducing the amount of ethylenic unsaturation contained therein. Early, heterogeneous catalyst comprising a supported metal, such as taught in United Kingdom Pat. Nos. 2,011,911 and 2,087,403, were used. Various metals or metal compounds, which may be used supported or unsupported, are also taught in U.S. Pat. No. 3,700,637. These catalysts are not, however, particularly active and many are not particularly selective and, as a result, high degrees of ethylenic unsaturation conversion frequently are not achievable without converting at least a portion of the cyano groups to amine groups. Later, mixed metal catalysts, particularly palladium in combination with one or more other metals, such as taught in U.S. Pat. No. 4,337,329, have been used but these catalysts too are not particularly active and, again, many are not particularly selective. More recently, it has been proposed to use a metal such as platinum, palladium, ruthenium and the like supported on silica as taught in U.S. Pat. No. 4,452,951 but these catalysts also frequently result in conversion of at least a portion of the cyano groups when a high degree of hydrogenation is achieved and the activity, particularly, when Pd is used remains relatively low. Still more recently, it has been proposed to use a catalyst prepared by combining a palladium carboxylate and a reducing agent such as hydrogen, as taught in U.S. Pat. No. 4,510,293, but still conversion of the cyano groups to amine groups frequently occurs at high conversion. Moreover, this catalyst, particularly, as prepared with hydrogen as the reducing agent is not particularly active. Even more recently, it has been proposed to use various ruthenium compounds as taught in U.S. Pat. No. 4,631,315 and the use of various rhodium complexes is known as taught in United Kingdom Pat. No. 1,558,491 and U.S. Pat. Nos. 3,700,637 and 4,647,627. At least certain of these latter catalysts do facilitate particularly selective hydrogenation of such polymers but the catalyst metals are either rather expensive or in short supply. In light of these deficiencies, then, the need for an improved catalyst composition which can be used to selectively hydrogenate polymers containing ethylenic unsaturation and one or more cyano groups which will permit relatively high conversion (saturation) of the ethylenic unsaturation in relatively short periods of time with reduced conversion of the cyano groups is believed to be readily apparent.

SUMMARY OF THE INVENTION

It has now been discovered that the foregoing and other disadvantages of the prior art processes for hydrogenating polymers containing ethylenic unsaturation and cyano groups can be avoided, or at least reduced, with the process of this invention. It is, therefore, an object of this invention to provide a process for selectively hydrogenating a polymer comprising both ethylenic unsaturation and cyano groups. It is another object of this invention to provide such a process which can yield a hydrogenated product having a significant portion of the ethylenic unsaturation converted (hydrogenated) with minimal conversion of cyano groups to amine groups. It is yet another object of this invention to provide such a process which uses a catalyst prepared from materials which are readily available or easily obtained. It is still a further object of this invention to provide such a process wherein the selective hydrogenation may be accomplished with relatively short contacting times. The foregoing and other objects and advantages will become apparent from the description of the invention set forth hereinafter and from the examples contained therein.

In accordance with the present invention, the foregoing and other objects and advantages are accomplished in a process using a catalyst prepared by contacting one or more of certain palladium compounds with an aluminum compound selected from the group consisting of aluminum hydrides, aluminum alkyls and mixtures thereof. The catalyst is prepared by combining the palladium compound or compounds and the aluminum compound or compounds in a suitable solvent. Hydrogenation of the polymer is accomplished at elevated temperatures and pressures and is also accomplished in a suitable solvent.

BRIEF DESCRIPTION OF THE DRAWING

The FIGURE is a graph showing the extent of ethylenic unsaturation conversion or hydrogenation at two different nominal holding time periods as a function of the aluminum to palladium molar ratio used to prepare the hydrogenation catalyst.

DETAILED DESCRIPTION OF THE INVENTION

As just indicated supra, the present invention relates to a process for selectively hydrogenating ethylenic unsaturation contained in a polymer comprising ethylenic unsaturation and one or more cyano groups. The hydrogenation is accomplished in the presence of a catalyst prepared by contacting one or more palladium compounds with one or more aluminum compounds in a suitable solvent. Hydrogenation of the polymer is accomplished at an elevated temperature and pressure in a suitable solvent for the polymer.

In general, any polymer containing ethylenic unsaturation and one or more cyano groups may be hydrogenated with the method of this invention. Polymers which may be hydrogenated, then, include addition polymers prepared by polymerizing one or more polyolefins, particularly diolefins, which polymers also contain one or more cyano groups. The cyano groups may be incorporated into the polymer by copolymerizing one or more ethylenically unsaturated nitriles with the polyolefin or polyolefins. The cyano groups may also be incorporated by grafting one or more ethylenically unsaturated nitriles onto a polymer containing ethylenic unsaturation. The cyano group may further be incorporated by reacting a polymer containing ethylenic unsaturation with a compound capable of adding a cyano group into the polymer. For example, one or more cyano groups may be introduced into a polymer containing metal atoms by reaction with $Cl-C\equiv N$, as taught, for example, in U.S. Pat. No. 3,135,716, the disclosure of which copending U.S. patent application is incorporated herein by reference. The polymers which may be hydrogenated with the process of this invention may also contain aromatic unsaturation. As is well known, aromatic unsaturation may be incorporated into a polymer by copolymerizing a monomer containing aromatic unsaturation such as a monoalkenyl aromatic hydrocarbon.

As is well known in the prior art, polymers comprising polyolefin monomer units as well as polymers containing both polyolefin monomer units and monoalkenyl aromatic hydrocarbon monomer units may be prepared by polymerizing the monomers in bulk, solution or emulsion. In general, any of the polymerization initiators or catalysts known in the prior art may be used to effect the polymerization. Suitable catalysts, then, include free radical, anionic and cationic initiators or polymerization catalysts. As is well known, however, the anionic and cationic initiators are not acceptable for use in emulsion polymerization. As is also well known in the prior art, ethylenically unsaturated nitriles do not lend themselves to polymerization or copolymerization with anionic and cationic initiators. Polymers prepared by copolymerizing one or more polyolefin monomers and one or more ethylenically unsaturated nitriles are, then, most generally, prepared with free radical initiators or catalysts. Moreover, copolymers containing one or more ethylenically unsaturated nitrile monomer units are most frequently prepared using emulsion techniques. When the polymer to be hydrogenated with the method of the present invention is, then, a copolymer containing one or more ethylenically unsaturated nitriles, which copolymer is prepared by direct copolymerization, as opposed to grafting or modification, emulsion techniques will generally be used as will a free radical initiator. Such polymers may be random, tapered or block. When the polymer to be hydrogenated, on the other hand, is a graft or modified copolymer the base polymer containing ethylenic unsaturation may first be prepared using any of the known techniques and an ethylenically unsaturated nitrile then grafted thereon using a free radical initiator or the cyano group incorporated via direct or indirect reaction between a base polymer containing ethylenic unsaturation or ethylenic and aromatic unsaturation and a compound capable of adding a cyano group into the polymer. Again, the base polymer, when not a homopolymer, may be random, tapered or block.

While the method of the present invention may be used to selectively hydrogenate any polymer containing ethylenic unsaturation and one or more cyano groups and, optionally, aromatic unsaturation, the method of this invention will be used most frequently to selectively hydrogenate copolymers of one or more conjugated diolefins and one or more ethylenically unsaturated nitriles; copolymers of one or more monoalkenyl aromatic hydrocarbon monomers, one or more conjugated diolefins and one or more ethylenically unsaturated nitriles; graft copolymers wherein one or more ethylenically unsaturated nitriles are grafted onto a base polymer of one or more conjugated diolefins or a base copolymer of one or more monoalkenyl aromatic hydrocarbon monomers and one or more conjugated diolefins; modified copolymers of one or more conjugated diolefins and modified copolymers of one or more monoalkenyl aromatic hydrocarbon monomers and one or more conjugated diolefins; said polymers being modified by reacting the polymer or a derivative thereof with a compound capable of adding a cyano group into the polymer. Each of these polymers may be prepared using methods well known in the prior art. In general, the molecular weight and relative composition of the polymers hydrogenated with the method of this invention are not critical. It is, however, important that the polymer be soluble in a suitable solvent for effecting the hydrogenation and this requirement could limit the maximum useful polymer molecular weight or the composition thereof with any given solvent.

In general, any of the palladium compounds known to be useful in the preparation of catalysts for the hydrogenation of ethylenic unsaturation can be used to prepare the catalyst of this invention. Suitable compounds, then, include palladium carboxylates having the formula $(RCOO)_n Pd$, R is a hydrocarbyl radical having from 1 to about 50 carbon atoms, preferably from about 5 to 30 carbon atoms, and n is a number satisfying the valence of the Pd; palladium chelates containing from about 3 to about 50 carbon atoms, preferably from about 3 to about 20 carbon atoms; alkoxides having the formula $(RCO)_n Pd$ wherein R is a hydrocarbon radical having from 1 to about 50 carbon atoms, preferably about 5 to about 30 carbon atoms, and n is a number satisfying the valence of the Pd., salts of sulfur-containing acids having the general formula $Pd(S)_x)_n$ and partial esters thereof; and palladium salts of aliphatic and aromatic sulfonic acids having the general formula $Pd(R'SO_3)_n$ wherein R' is an aliphatic or aromatic radical having from 1 to about 20 carbon atoms and n is a number satisfying the valence of Pd. The carboxylates useful in preparing the catalyst of this invention include palladium salts of hydrocarbon aliphatic acids, hydrocarbon cycloaliphatic acids and hydrocarbon aromatic acids. Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, rhodinic acid and the like. Examples of hydrocarbon aromatic acids include benzoic acid and alkyl-substituted aromatic acids in which the alkyl substitution has from 1 to about 20 carbon atoms. Examples of cycloalphatic acids include naphthenic acid, cyclohexylcarboxylic acid, abietic-type resin acids and the like. Suitable chelating agents which may be combined with variuos palladium compounds thereby yielding a palladium chelate compound useful in the preparation of the catalyst of this invention include β-ketones, α-hydroxycarboxylic acids, β-hydroxy carboxylic acids, β-hydroxycarbonyl compounds and the like. Examples of β-ketones which may be used include acetylacetone, 1,3-hexanedione, 3,5-nonadione, methylacetoacetate, ethylacetoacetate and the like. Examples of α-hydroxycarboxylic acid which may be used include lactic acid, glycolic acid, α-hydroxyphenylacetic acid, α-hydroxy-α-phenylacetic acid, α-hydroxycyclohexylacetic acid and the like. Examples of β-hydroxycarboxylic acids include salicylic acid, alkyl-substituted salicyclic acids and the like. Examples of β-hydroxylcarbonyl compounds that may be used include salicylaldehyde, o-hydroxyacetophenone and the like. The metal alkoxides which are useful in preparing catalysts of this invention include palladium alkoxides of hydrocarbon aliphatic alcohols, hydrocarbon cycloaliphatic alcohols and hydrocarbon aromatic alcohols. Examples of hydrocarbon aliphatic alcohols include hexanol, ethylhexanol, heptanol, octanol, nonanol, decanol, dodecanol and the like. The palladium metal salts of sulfur-containing acids and partial esters thereof include palladium salts of sulfonic acid, sulfuric acid, sulphurous acid, partial esters thereof and the like. Of the aliphatic and aromatic acids salts, salts of aromatic sulfonic acids such as benzene sulfonic acid, p-toluene sulfonic acid and the like are particularly useful.

In general, any one or more of the aluminum compounds known to be useful in preparing a hydrogenation catalyst may be used to prepare the hydrogenation catalyst used in the method of this invention. Suitable aluminum compounds, then, include those aluminum compounds having the general formula: $Al(R)_3$; wherein each R may be the same or a different radical selected from H and hydrocarbyl radicals having from 1 to about 20 carbon atoms. Preferably, each R will be an alkyl radical having from 1 to about 5 carbon atoms.

In general, the hydrogenation catalyst useful in the hydrogenation process of this invention will be prepared by combining the palladium compound or compounds and the aluminum compound or compounds in a suitable solvent or diluent. In general, the palladium and aluminum compounds will be combined so as to provide an Al:Pd atomic ratio within the range from about 0.1:1 to about 1.5:1. In general, the contacting will be accomplished at a temperature within the range from about 20° to about 100° C. in an inert or reducing atmosphere. In general, any solvent or diluent that does not react with either the palladium or aluminum compounds used to prepare the catalyst may be used during the preparation of said catalyst. It will, of course, be most convenient to prepare the catalyst in the same solvent in which the polymer is dissolved and in which the subsequent hydrogenation will occur and such solvents may be used to prepare the catalyst used in the method of this invention. Suitable solvents for the polymers which may be hydrogenated with the process of this invention are discussed infra. Catalysts prepared in an ether solvent are, however, significantly more active than catalyst prepared in hydrocarbon. The use of an ether solvent in preparing the catalyst is, therefore, preferred. In general, any linear or cyclic ether having from two to about 20 carbon atoms and from 1 to about 3 oxygen atoms may be used. Diethers having from about 4 to about 10 carbon atoms are particularly effective and are preferred. In general, the palladium and aluminum compounds used to prepare the hydrogenation catalyst may be, and preferably will be, combined in a separate vessel but each of the components could be separately introduced into the hydrogenation reaction vessel so long as the temperature at which these components are contacted is within the range heretofore specified. In general, contacting times within the range from about 1 to about 120 minutes will be sufficient to effect reduction of the palladium compound or compounds or otherwise produce an active catalyst.

In general, the hydrogenation will be accomplished with the polymer in solution. In general, any of the solvents known in the prior art to be useful for dissolving copolymers containing one or more conjugated diolefins, optionally one or more alkenyl aromatic hydrocarbons, and one or more cyano groups may be used to effect the hydrogenation in the process of this invention. Suitable solvents, then, include linear and cyclic ethers such as diethyl ether, tetrahydrofuran, and the like; halogenated, particularly chlorinated, aromatic hydrocarbons such as chlorobenzene, dichlorobenzene, methylchlorobenzene and the like; aliphatic and cyclic ketones such as acetone, methylethyl ketone, diethyl ketone, butanone, pentanone, cyclopentanone, cyclohexanone and the like. In general, the hydrogenation will be accomplished at a temperature within the range from about 20° C. to about 175° C. at a total pressure within the range from about 50 psig to about 1,000 psig and at a hydrogen partial pressure within the range from about 50 psig to about 950 psig. In general, the catalyst or the components thereof will be added during hydrogenation in a concentration sufficient to provide from about 0.4 to about 40 mmoles (gm moles) of palladium per lb. of polymer. In general, contacting at hydrogenation conditions will be continued for a nominal holding time within the range from about 10 to about 360 minutes. With respect to the hydrogenation, it should be noted that while selective hydrogenation of ethylenic unsaturation may be accomplished at the conditions just recited conversion of the cyano groups to amine groups will, generally, begin to occur when the extent of hydrogenation of the ethylenic unsaturation reaches about 90%. In this regard, it should be noted that of the several variables available for control of the extent of hydrogenation, temperature, catalyst concentration and holding time generally have the greatest impact. These variables may, then, be carefully controlled so as to avoid any significant conversion of the cyano groups to amine groups. Hydrogenation of aromatic unsaturation, generally, will not occur at the hydrogenation conditions contemplated for use in the process of this invention. Some conversion of aromatic unsaturation may, however, occur at higher ethylenic unsaturation conversions.

While the inventors do not wish to be bound by any particular theory, it is believed that when the palladium compound or compounds and the aluminum compound or compounds are combined, a reaction occurs to form a catalyst. The catalyst thus formed is stable and can be stored for relatively long periods prior to use.

After hydrogenation of the polymer has been completed, the polymer may be recovered as a crumb using methods well known in the prior art. For example, the polymer may be recovered as a crumb by precipitation with a polar compound such as an alcohol. Alternatively, the solution may be contacted with steam or water and the solvent then removed by an azeotropic distillation. Generally, these recovery techniques will also effectively remove a significant portion of the catalyst.

The hydrogenated polymers produced by the method of this invention can be used in any of the applications well known in the prior art for such hydrogenated polymers. For example, selectively hydrogenated copolymers comprising one or more conjugated diolefin monomer units and cyano groups will have improved weatherability and temperature resistance and may be used in seals, packing, tubes and the like.

PREFERRED EMBODIMENT OF THE INVENTION

In a preferred embodiment of the present invention, a random copolymer comprising from about 55 wt % to about 85 wt % conjugated diolefin monomer units and from about 45 wt % to about 15 wt % of unsaturated nitrile monomer units will be selectively hydrogenated in solution with a catalyst prepared by combining a palladium carboxylate having from about 5 to about 30 carbon atoms and an aluminum trialkyl wherein each alkyl group may be the same or different having from 1 to about 5 carbon atoms. In a most preferred embodiment, a butadiene/acrylonitrile copolymer will be hydrogenated in the presence of a catalyst prepared by contacting a Palladium 2-ethylhexanoate with triethyl aluminum. In the preferred and most preferred embodiments, the palladium carboxylate and the aluminum trialkyl will be combined in amounts sufficient to provide an Al:Pd atomic ratio within the range from about 0.3 to about 0.9. The catalyst will be prepared in a separate step using a diether containing from about 4 to about 10 carbon atoms as solvent. In a most preferred embodiment, 1,2-dimethyoxyethane will be used as the solvent. In both the preferred and most preferred embodiments, the components used to prepare the catalyst will be contacted at a temperature within the range from about 25° C. to about 60° C. and the contacting will be continued for a period of time within the range from about 15 to about 60 minutes. In the preferred embodiment, the hydrogenation will be accomplished in an aliphatic ketone having from about 3 to about 10 carbon atoms as a solvent, most preferably methylethyl ketone, at a temperature within the range from about 20° C. to about 100° C. at a total pressure within the range from about 50 psig to about 1,000 psig and at a hydrogen partial pressure within the range from 50 psig to about 950 psig. The selective hydrogenation will be accomplished so as to convert (saturate) at least about 85% of the ethylenic unsaturation initially contained in the polymer and such that no more than about 10% of the cyano groups are converted to amine groups. In the preferred embodiment, the polymer will be present in solution at a concentration within the range from about 2 to about 15 wt % based upon combined polymer and solvent. In the preferred embodiment, the nominal holding time at hydrogenation conditions will be within the range from about 30 to about 120 minutes. In both the preferred and most preferred embodiments, sufficient catalyst will be added during the hydrogenation to provide from about 0.2 to about 15 mmoles (gm moles) Palladium per lb of polymer.

Having thus broadly described the present invention and a preferred and most preferred embodiment thereof, it is believed that the invention will become even more apparent by reference to the following Examples. It will be appreciated, however, that the Examples are presented solely for the purpose of illustration and should not be construed as limiting the invention unless one or more of the limitations introduced in the Examples are incorporated into the claims appended hereto and then only to the extent that such limitations are thus incorporated.

EXAMPLE 1

In this Example, a series of hydrogenation catalysts were prepared by combining a palladium salt of 2-ethylhexanoic acid and triethyl aluminum at different Al:Pd atomic ratios. Also, for purposes of comparison, a catalyst, hereinafter referred to as Catalyst No. 1, was prepared with palladium 2-ethylhexanoate without triethyl aluminum. This catalyst was, then, prepared simply by reducing the palladium salt of 2-ethylhexanoic acid with hydrogen in the hydrogenation reactor and in the presence of the polymer. In the catalysts prepared in this Example, the Al:Pd atomic ratio ranged, then, from 0 to about 1.5. In preparing those catalysts wherein aluminum triethyl was used as a reducing agent, the palladium salt and aluminum triethyl were combined in 1,2-dimethoxyethane, contacted at a temperature of 25° C. and then allowed to exotherm for 30 minutes. The catalyst which was prepared without aluminum was prepared by contacting the palladium salt with hydrogen in methylethylketone and in the presence of the polymer at a temperature of 60° C. and at a hydrogen partial pressure of about 895 psig. In preparing each of the catalysts, the palladium salt was present in the solvent at a concentration of 40 mmoles/liter. After preparation, each of the catalysts prepared with triethyl aluminum were retained in the solvent and stored at a temperature of 25° C. until later used to selectively hydrogenate a modified block copolymer. In all, nine catalysts were prepared in this Example. For convenience, these catalysts are hereinafter referred to as catalysts 1–9, the relative Al:Pd atomic ratio used in preparing each of the nine catalysts is summarized in the following Table:

TABLE

| Catalyst No. | Al:Pd Atomic Ratio |
|---|---|
| 1 | 0 |
| 2 | 0.1 |
| 3 | 0.3 |
| 4 | 0.5 |
| 5 | 0.7 |
| 6 | 0.9 |
| 7 | 1.1 |
| 8 | 1.3 |
| 9 | 1.5 |

EXAMPLE 2

In this Example, each of the catalysts prepared in Example 1 was used to selectively hydrogenate a butadiene-acrylonitrile rubber containing 80 wt % butadiene and 20 wt % acrylonitrile. Each of the hydrogenations was accomplished in the presence of sufficient catalyst to provide about 8.5 mmoles Pd per lb of polymer at 60° C., at a total pressure of 900 psig and at a hydrogen partial pressure of about 895 psig. Each of the hydrogenations was accomplished in a methylethyl ketone solvent and in each of the hydrogenation runs the polymer was present at a concentration of 5 wt % based on total polymer and solvent. During each hydrogenation run, a sample was withdrawn after 30 minutes, and at two hours and the extent of hydrogenation determined on each of these samples. The extent of hydrogenation was determined using an ozone titration to determine the relative amount of ethylenical unsaturation remaining in the polymer. The extent of hydrogenation realized with each of the catalysts at both 30 minutes and two hours is plotted in the attached FIGURE and is summarized in the following Table:

TABLE

| Catalyst No. | Al:Pd Atomic Ratio | Extent —C=C—conv. after 30 min. | 120 min. |
|---|---|---|---|
| 1 | 0 | 22 | 78 |
| 2 | 0.1 | 58 | 80 |
| 3 | 0.3 | 64 | 90 |
| 4 | 0.5 | 64 | 88 |
| 5 | 0.7 | 66 | 88 |
| 6 | 0.9 | 68 | 87 |
| 7 | 1.1 | 67 | 82 |
| 8 | 1.3 | 62 | 75 |
| 9 | 1.5 | 30 | 38 |

As will be apparent from the data summarized in the preceding Table and from the FIGURE, best performance was realized with those catalysts prepared with an Al:Pd atomic ratio from about 0.3 to about 0.9. That this is the case is particularly apparent from the curve in the FIGURE obtained with data taken after a nominal holding time of two hours.

While the present invention has been described and illustrated by reference to particular embodiments thereof, it will be appreciated by those of ordinary skill in the art that the same lends itself to variations not necessarily described or illustrated herein. For this reason, then, reference should be made solely to the appended claims for purposes of determining the true scope of the present invention.

Having thus described and illustrated the present invention, what is claimed is:

1. A process for selectively hydrogenating the ethylenic unsaturation in a polymer comprising ethylenic unsaturation and cyano groups comprising the steps of:
   (a) contacting a polymer comprising polymerized conjugated diene units having ethylenic unsaturation and cyano groups selected from polymerized nitrile units and grafted cyano compounds with hydrogen in a first suitable solvent, and in the presence of a catalyst prepared by combining one or more palladium carboxylates with one or more aluminum compounds, selected from aluminum hydrides and aluminum alkyls, in a second suitable solvent, which second suitable solvent may be the same or different from said first suitable solvent;
   (b) maintaining the contact in step (a) for a sufficient period of time permit conversion of at least a portion of the ethylenic unsaturation contained in said polymer; and
   (c) recovering an at least partially hydrogenated polymer.

2. The process of claim 1 wherein the contacting in step (a) is accomplished at a temperature within the range from about 20° to about 175° C. at a total pressure within the range from about 50 to about 1,000 psig and a hydrogen partial pressure within the range from about 50 to about 950 psig.

3. The process of claim 2 wherein the contacting in step (a) is continued for a nominal holding time within the range from about 10 to about 360 minutes.

4. The process of claim 3 wherein said one or more palladium compounds is a palladium carboxylate containing from 1 to about 50 carbon atoms.

5. The process of claim 4 wherein said palladium carboxylate contains from about 5 to about 30 carbon atoms.

6. The process of claim 5 wherein said palladium carboxylate is palladium 2-ethylhexanoate.

7. The process of claim 6 wherein said catalyst is prepared by combining the palladium 2-ethylhexanoate and the one or more aluminum compounds in a ratio sufficient to provide an Al:Pd atomic ratio within the range from about 0.1:1 to about 1.5:1.

8. The process of claim 7 wherein said Al:Pd atomic ratio is within the range from about 0.3:1 to about 0.9:1.

9. The process of claim 8 wherein said one or more palladium compounds and said one or more aluminum compounds are combined in an ether having from about 2 to about 20 carbon atoms.

10. The process of claim 9 wherein said ether is a diether having from about 4 to about 10 carbon atoms.

11. The process of claim 10 wherein said ether is 1,2-dimethoxyethane.

12. The process of claim 2 wherein said first suitable solvent is a ketone having from 3 to about 10 carbon atoms.

13. The process of claim 12 wherein said ketone is methyl ethyl ketone.

14. The method of claim 2 wherein said hydrogenation is accomplished so as to convert (saturate) at least about 85% of the ethylenic unsaturation initially contained in the polymer while converting less than about 5% of the cyano groups to amine groups.

* * * * *